(12) United States Patent
Muraoka et al.

(10) Patent No.: US 6,472,070 B1
(45) Date of Patent: Oct. 29, 2002

(54) FIRE-RESISTANT COATING MATERIAL

(75) Inventors: Hitomi Muraoka; Masaki Tono; Kazuhiro Okada, all of Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/581,526

(22) PCT Filed: Nov. 25, 1998

(86) PCT No.: PCT/JP99/06584

§ 371 (c)(1),
(2), (4) Date: Jul. 7, 2000

(87) PCT Pub. No.: WO00/32707

PCT Pub. Date: Jun. 8, 2000

(30) Foreign Application Priority Data

Nov. 30, 1998 (JP) .......................... 10-339289

(51) Int. Cl.⁷ .............................. B32B 15/08
(52) U.S. Cl. ................. 428/418; 106/18.11; 106/18.18; 252/606; 252/609; 523/179; 523/468
(58) Field of Search ................. 523/179, 468; 106/18.11, 18.14, 18.15, 18.16, 18.17, 18.18; 428/413, 418; 252/606, 609

(56) References Cited

U.S. PATENT DOCUMENTS 3,574,644 A  4/1971 Franciszek et al.
6,153,674 A * 11/2000 Landin ........................ 524/35

FOREIGN PATENT DOCUMENTS

| EP | 0302987 A | 2/1988 |
| EP | 0730000 A | 3/1996 |
| EP | 0814121 A | 6/1996 |
| WO | WO9831730 A | 7/1998 |

OTHER PUBLICATIONS

Patent Abstracts of Japan, vol. 1999, No. 09 & JP 11 116776A (Sekisui Chemical Co., Ltd.) Oct. 1997.

* cited by examiner

Primary Examiner—Robert Dawson
Assistant Examiner—D. Aylward
(74) Attorney, Agent, or Firm—Townsend & Banta

(57) ABSTRACT

The present invention is a fire-resistant paint containing an epoxy resin, a hardener, and an inorganic filler wherein ① for the total of 100 weight parts of the epoxy resin and the hardener, ② 200–500 weight parts of the inorganic filler, chosen from a group consisting of neutralized thermally expandable graphite, metal carbonate, and a hydrated inorganic compound is contained;

③ for the inorganic filler, at least 15–400 weight parts of neutralized thermally expandable graphite is contained; and ④ the viscosity of the fire-resistant paint is 1–1,000 ps as measured by a B-type viscometer. The fire-resistant paint of the present invention has particularly remarkable fire resistance, and can be used in a wide range of applications.

31 Claims, No Drawings

FIRE-RESISTANT COATING MATERIAL

FIELD OF THE INVENTION

This invention relates in general to a fire-resistant paint, and more particularly to a fire-resistant paint which is used to improve the fire-resistance of building materials by means of coating.

BACKGROUND OF THE INVENTION

In the field of building materials fire-resistance has an important meaning. Recently, as the applications of resin materials expand, resin materials are widely used for building materials and resin materials with fire-resistant properties are desired.

For such fire-resistance properties, not only the resin material itself is required to resist combustion, but the resin material is also required to protect the building material from flames when it is used as a fire-resistant coating material on building materials. Although the intrinsic nature of resin materials is to burn and melt, they must not burn or melt and come off when they are used as fire-resistant materials.

A fire-resistant coating is sometimes applied in advance on beams, columns, and such because of the desire to reduce the processes on the construction site. However, coating cannot be applied in advance on beam-column joints, junctions, and metal fixtures for installing outer walls and such. These parts have to be done on the construction site. For application on the construction site, painting such as by spraying is easier to implement than coating with a coating material in a sheet or board form. Painting is also more preferable when coating a structure with a complex form.

For a spray type fire-resistant coating, rockwool spraying is common, but this requires a thicker coating to satisfy the fire-resistant properties. Fire-resistant paint is widely known to give a thinner fire-resistant coating. However, conventional fire-resistant paint has problems in that the residue after heat expansion is fragile and so the residue after expansion may come off, and also that it contains polyhydric alcohol which has a high solubility in water, resulting in water resistance problems and requiring a top coat layer on the paint surface.

In view of what is described above, a fire-resistant paint with both a thin coating thickness and a solid residue after expansion is desired. The object of the present invention is to provide a heat expanding fire-resistant paint which manifests particularly prominent fire-resistant performance by leaving a residue with sufficient shape retaining properties after combustion, is safe for human body, and is easily coated on any part.

The problems which have been solved by the present invention are described below by referring to specific conventional technology.

①  Japanese unexamined patent publication Tokkai Sho 58-2356 and Tokkai Sho 57-67673 discloses fire protective butyl rubber paint. When lamination with other components is done after butyl rubber paint is applied and air dried, fasteners such as screws and/or nails have to be used for securing, which causes cracks and/or fissures resulting in reduced fire-resistance performance. In order to improve on this issue, Tokkai Sho 58-2356 and Tokkai Sho 57-67673 disclose a paint which uses butyl rubber for the resin binder. However, antimony trioxide, in the case of Tokkai Sho 57-67673, and asbestos and/or halogen, in the case of Tokkai Sho 58-2356, have to be added for sufficient fire-resistance performance. There is a problem in that these substances can have adverse effects on the human body during manufacturing, applying, burning, etc. On the other hand, the fire-resistant paint of the present invention can achieve superior fire-resistant performance using substances which are safe to the human body.

②  Japanese examined patent publication Tokko Sho 63-7238 illustrates a foaming fire-protective composition composed of thermally expandable graphite and a phosphorus compound. A low molecular weight hydrocarbon (or derivative) is used to give a putty form to this composition. When this is used on a vertical site and heated, sagging occurs before foaming due to its insufficient retaining property resulting in insufficient fire-protective performance. On the other hand, the fire-resistant paint of the present invention can be assured to have a sufficient retaining property by proper selection of the resin binder so there is no sagging before foaming when used on a vertical site and heated. Therefore, it can manifest sufficient fire-resistant performance regardless of heating conditions.

③  Tokkai Hei 5-70540 illustrates a paint which uses thermally expandable graphite, a phosphorus compound, a polyhydric alcohol, and a nitrogen-containing compound-based foaming agent, with urethane resin for the binder. However, since a polyhydric alcohol which is highly soluble in water is used, there is a problem in terms of water resistance of the paint, requiring top coating. When a polyhydric alcohol is not used, the residue does not have sufficient strength.

④  Tokkai Hei 9-227716 and Tokkai Hei 10-7838 propose a fire-resistant resin composition which leaves a firm residue after expansion. However, because of its viscosity, it is hard to use as a coating paint.

⑤  Publication WO98/31730 of PCT application (PCT/JP97/02258) illustrates a thermally expandable fire-resistant molded sheet. However, since this is a molded sheet, covering special sites on a building component is difficult.

⑥  Tokkai Hei 9-183978 illustrates a foaming composition for a fire-resistant paint which is an acrylic resin containing low temperature expandable graphite, a phosphoric acid compound, melamine, and a polyhydric alcohol. However, since a polyhydric alcohol which is highly soluble in water is used, there is a problem in terms of water resistance of the paint, requiring top coating. When a polyhydric alcohol is not used, the residue does not have sufficient strength.

Compared with these, the fire-resistant paint of the present invention can be applied on any site, can ensure sufficient residue strength without using a polyhydric alcohol, and has no problems in terms of water resistance.

DISCLOSURE OF THE INVENTION (1) The first (claim) of the present invention is a fire-resistant paint containing an epoxy resin, a hardener, and an inorganic filler wherein ①  for the total of 100 weight parts of the epoxy resin and the hardener, ②  200–500 weight parts of the inorganic filler, chosen from a group consisting of neutralized thermally expandable graphite, metal carbonate, and a hydrated inorganic compound is contained;

③  for the inorganic filler, at least 15–400 weight parts of neutralized thermally expandable graphite is contained; and ④ the viscosity of the fire-resistant paint is 1–1,000 ps as measured by a B-type viscometer.

(2) The second (claim) of the present invention is a fire-resistant paint containing an epoxy resin, a hardener, and an inorganic filler wherein ① for the total of 100 weight parts of the epoxy resin and the hardener, ② 15–400 weight parts of neutralized thermally expandable graphite and a phosphorus compound is contained;

③ the weight ratio between the neutralized thermally expandable graphite and the phosphorus compound is (thermally expandable graphite/phosphorus compound)=0.01–9;

④ 10–400 weight parts of a metal carbonate and/or hydrated inorganic compound is contained;

⑤ the total amount of the neutralized thermally expandable graphite and phosphorus compound, and the metal carbonate and/or hydrated inorganic compound is 200–500 weight parts; and ⑥ the viscosity of the fire-resistant paint is 1–1,000 ps as measured by a B-type viscometer.

(3) The third (claim) of the invention is a fire-resistant paint containing butyl rubber or isobutylene rubber and an inorganic filler wherein ① Flory's viscosity-average molecular weight of the butyl rubber or isobutylene rubber is 5,000–4,000,000; and ② for 100 weight parts of the butyl rubber or isobutylene rubber, ③ 200–500 weight parts of the inorganic filler, chosen from a group consisting of neutralized thermally expandable graphite, metal carbonate, and a hydrated inorganic compound is contained;

④ for the inorganic filler, at least 15–400 weight parts of neutralized thermally expandable graphite is contained; and ⑤ the viscosity of the fire-resistant paint is 1–1,000 ps as measured by a B-type viscometer.

(4) The fourth (claim) of the invention is a fire-resistant paint containing butyl rubber or. isobutylene rubber and an inorganic filler wherein ① Flory's viscosity-average molecular weight of the butyl rubber or isobutylene rubber is 5,000–4,000,000; and ② for 100 weight parts of the butyl rubber or isobutylene rubber, ③ 15–400 weight parts of neutralized thermally expandable graphite and a phosphorus compound is contained;

④ the weight ratio between the neutralized thermally expandable graphite and the phosphorus compound is (thermally expandable graphite/phosphorus compound)=0.01–9;

⑤ 10–400 weight parts of a metal carbonate and/or hydrated inorganic compound is contained;

⑥ the total amount of the neutralized thermally expandable graphite and phosphorus compound, and the metal carbonate and/or hydrated inorganic compound is 200–500 weight parts; and ⑦ the viscosity of the fire-resistant paint is 1–1,000 ps as measured by a B-type viscometer.

Also, the present invention is the following fire-resistant paints derived from any of the aforementioned first-fourth inventions, as well as base materials which are coated with the fire-resistant paints.

(5) Said fire-resistant paint wherein the average particle size of said neutralized thermally expandable graphite is 20–200 mesh.

(6) Said fire-resistant paint wherein said metal carbonate is one or more metal carbonates chosen from a group consisting of calcium carbonate, magnesium carbonate, strontium carbonate, barium carbonate and zinc carbonate.

(7) Said fire-resistant paint wherein said hydrated inorganic compound is one or more hydrated inorganic compounds chosen from a group consisting of calcium hydroxide, magnesium hydroxide, aluminum hydroxide, and hydrotalcite.

(8) The fire-resistant paint of the aforementioned first or second invention wherein said fire-resistant paint is a no-solvent paint.

(9) The fire-resistant paint of the aforementioned third or fourth invention wherein said fire-resistant paint is a solvent-based or emulsion-based paint containing an organic solvent or water.

(10) A fire-resistant paint-coated base material coated with the paint film by applying the aforementioned fire-resistant paint on the base material.

(11) Said fire-resistant paint-coated base material wherein said base material is non-woven fabric, woven fabric, film, plastic board, wooden board, ceramic board, rockwool board, plaster board, or metal board.

THE BEST MODES OF THE EMBODIMENTS

The configuration of the present invention is described in detail below.

(1) The First and the Second Invention

The fire-resistance performance of the fire-resistant paint of the present invention manifests synergistically by combining an epoxy resin, a hardener, and a specific inorganic filler containing neutralized thermally expandable graphite in specific blend ratios. Although the action mechanism is not clear, the cross- inked structure of the epoxy resin contributes to the strength of the fire-resistant paint film and, when heated by fire, the thermally expandable graphite forms a heat insulating layer after expansion to prevent heat transfer. When this happens, it is believed that the epoxy resin is carbonized and contributes as a heat insulating layer after expansion wherein the cross-linked structure of the epoxy resin works favorably for the shape retaining properties following the heat expansion. The inorganic filler increases the heat capacity when heated, and the addition of the phosphorus compound further improves the shape retaining ability of the inorganic filler and the heat insulating layer after expansion.

Select ion of the epoxy resin used in the present invention is not limited in particular, and prior art epoxy resins used in paints can be used. Examples of the glycidyl ether type with two functional groups include the polyethylene glycol type, polypropylene glycol type, neopentyl glycol type, 1,6-hexanediol type, trimethylol propane type, bisphenol A type, propylene oxide-bisphenol A type, hydrogenated bisphenol A type, and bisphenol F type. Examples of the glycidyl ester type include the hexahydro phthalic anhydride type, tetrahydro phthalic anhydride type, dimeric acid type, and p-oxybenzoic acid type. Examples of the glycidyl ether type with multiple functional groups include the phenol novolac type, orthocresol novolac type, DPP novolac type, and dicyclopentadiene-phenol type. These can be used independently or in combinations of two or more.

The epoxy resin used in the present invention manifests heat insulating properties and shape retaining properties in the carbonized layer after heating. Within the range which does not affect this effect, other resins can be added as a resin component. A preferable amount of the other resins to be added is up to five times the weight of the epoxy resin. If the amount exceeds this range, then the effect of the present invention may not manifest.

For the hardener used in the present invention, hardeners that are commonly used as epoxy resin hardeners can be used. Examples of the polyaddition type include a poly amine, acid anhydride, poly phenol, and poly mercaptane. Examples of the catalyst type include a tertiary amine, imidazole (and its derivatives), and Lewis acid complex. For the amount of the hardener to be added, any amount within the range in which the epoxy resin hardens can be used. Generally, 80–10 wt % is used for 20–90 wt % of the epoxy resin.

(2) The Third and the Fourth Invention

The fire-resistance performance of the fire-resistant paint of the present invention manifests synergistically by combining butyl rubber or isobutylene rubber with a specific molecular weight and specific inorganic filler containing neutralized thermally expandable graphite in specific blend ratios. Although the action mechanism is not clear, the butyl rubber or isobutylene rubber with a specific molecular weight contributes to the properties of the fire-resistant paint film, and, when heated by fire, the thermally expandable graphite forms a heat insulating layer after expansion to prevent heat transfer. When this happens, it is believed that the butyl rubber or isobutylene rubber with a specific molecular weight is carbonized and contributes as a heat insulating layer after expansion and works favorably for the shape retaining properties after the heat expansion. The inorganic filler increases the heat capacity when heated, and the addition of the phosphorus compound further improves the shape retaining ability of the inorganic filler and the heat insulating layer after expansion.

The butyl rubber and/or isobutylene rubber used in the present invention are described below. In the fire-resistant paint of the present invention, butyl rubber and/or isobutylene rubber are used for the binder resin. By using sticky butyl rubber or isobutylene rubber, lamination and temporary fixation with other components such as a water protective sheet and metal can be easily done even after the paint is dried, and therefore the number of the mounting components can be reduced, or assembly can be done without any mounting components, resulting in better workability. When nails or screws are used for fixation, no cracks develop around them because the paint is flexible. Also, since the sealing properties are good, the homogeneity of the paint film thickness is not affected either.

The Flory's viscosity-average molecular weight of the butyl rubber or isobutylene rubber must be 5,000–4,000,000, preferably 10,000–1,000,000, and more preferably 200,000–500,000. If the Flory's viscosity-average molecular weight is less than 5,000, then the aggregation force is insufficient and therefore sufficient paint film strength cannot be obtained. Also, since the flowability at normal temperatures is high, there may be sagging over time when painting is done on a vertical surface. If the Flory's viscosity-average molecular weight is more than 4,000,000, then the dissolving rate into the solvent slows down, resulting in lower productivity, and a high viscosity may affect the workability as a paint. Furthermore, if the Flory's viscosity-average molecular weight is 200,000 or more, then chipping is easy and productivity improves. If the Flory's viscosity-average molecular weight is 500,000 or less, the suitable range of stickiness, which will be discussed later, can be ensured by the binder resin alone.

When considering lamination of the paint film and another component after drying, the suitable range of stickiness, based on JIS Z 0237, is 500 gf/25 mm-6,000 gf/25 mm of peeling force when the prepared paint film is pasted on a galvanized iron sheet and peeled off from the galvanized iron sheet after one hour at a velocity of 300 mm/min in the 90 degree direction. If the peeling force is less than 500 gf/25 mm then, although there is no problem for temporary securing, supporting another component is difficult. If the peeling force is more than 6,000 gf/25 mm, then no change/modification is possible if inadvertent pasting happens during the lamination process, resulting in reduced productivity. The stickiness can be adjusted by the addition of poly butene, tackifier, etc., as well.

The butyl rubber or isobutylene rubber with the as aforementioned viscosity-average molecular weight range can be used independently or in combination of two or more.

Furthermore, cross-linking or vulcanization can be done within the range which does not impede the fire-resistance performance and solubility in the solvent.

Selection of the methods for cross-linking or vulcanization of the aforementioned butyl rubber is not limited in particular. A method which uses a cross-linking agent is commonly used. Examples of the cross-linking agent include a combination of sulfur, dimethyl carbamate, and thiazole, a combination of morpholine disulfide and dithio carbamate; and quinone dioxime. Cross-linking improves the rubber properties, and therefore it manifests better followability when strain occurs in the component after the paint application, and the retaining strength at the time of heating also improves.

(3) The inorganic filler used in the first-fourth of the present invention is described below.

① Thermally expandable graphite is a prior art substance, and it is prepared by treating powder of natural scaly graphite, heat decomposed graphite, Kish graphite, etc. with an inorganic acid such as concentrated sulfuric acid, nitric acid, and selenic acid, and a strong oxidizing agent such as concentrated nitric acid, perchloric acid, perchlorate, permanganate, dicrhomate, and hydrogen peroxide to produce a graphite inter-layer compound. This is a crystalline compound which maintains the layered structure of carbon.

In the present invention, the thermally expandable graphite obtained by the aforementioned acid treatment is then neutralized with ammonia, an aliphatic lower amine, alkali metal compound, alkali earth metal compound, etc. Examples of the aliphatic lower amine include monomethyl amine, dimethyl amine, trimethyl amine, ethyl amine, propyl amine, and butyl amine. Examples of the alkali metal compound and the alkali earth metal compound include hydroxide, oxide, carbonate, sulfate, and organic acid salts of potassium, sodium, calcium, barium, and magnesium.

The particle size of the neutralized thermally expandable graphite is preferably 20–200 mesh. If the particle size is smaller than 200 mesh, then the degree of expansion of the graphite decreases and an adequate fire-resistant heat insulating layer cannot be obtained. If the particle size is larger than 20 mesh then, although a larger degree of expansion is effective, dispersion becomes poor when kneading with the resin resulting in reduction of the physical properties.

② The metal carbonate used for the aforementioned inorganic filler foams at the time of combustion and forms burned products, and therefore is preferable in terms of increasing the shape retaining properties. Specific examples include calcium carbonate, magnesium carbonate, strontium carbonate, barium carbonate, and zinc carbonate. These can be used independently or in combinations of two or more.

③ The hydrated inorganic compound used for the aforementioned inorganic filler becomes dehydrated when heated and absorbs heat, and therefore is preferable in terms of increasing the heat resistance. Specific examples include calcium hydroxide, magnesium hydroxide, aluminum hydroxide, and hydrotalcite. These can be used independently or in combinations of two or more.

A The particle size of the hydrated inorganic compound and the metal carbonate is preferably 0.5–100 micrometers, and more preferably 1–50 micrometers.

When the amounts of the hydrated inorganic compound and the metal carbonate to be added are small, the dispersibility significantly influences the performance, and therefore a smaller particle size is preferable. However, if it is less than 0.5 micrometers secondary aggregation occurs, which worsens the dispersibility. When the amount of the hydrated inorganic compound and the metal carbonate to be added is large, the viscosity increases as more is filled. However, by making the particle size larger, the increase in the viscosity of the fire-resistant paint can be kept lower, and thus more can be added. If it is more than 100 micrometers, then the surface properties of the paint film and the paint film strength may decrease.

(4) The phosphorus compound used in the second and the fourth invention is described below.

Selection of the phosphorus compound is not limited in particular. Examples include red phosphorus; various phosphoric esters such as triphenyl phosphate, tricresyl phosphate, trixylenyl phosphate, cresyldiphenyl phosphate, and xylenyl diphenyl phosphate; metal phosphate such as sodium phosphate, potassium phosphate, and magnesium phosphate; polyammonium phosphate and its derivatives; and the compound represented by the following structural formula (1). Among them, polyammonium phosphate and its derivatives are preferable. The aforementioned phosphorus compounds can be used independently or in combinations of two or more.

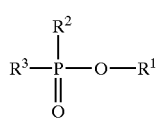

(1)

In this formula, $R^1$ and $R^3$ denote hydrogen, a linear chain or branched chain alkyl group having 1–16 carbon atoms or an aryl group having 6–16 carbon atoms $R^2$ denotes a hydroxyl group, a linear chain or branched chain alkyl group having 1–16 carbon atoms, a linear chain or branched chain alkoxyl group having 1–16 carbon atoms, an aryl group having 6–16 carbon atoms, or an aryloxy group having 6–16 carbon atoms.

For red phosphorus, commercially available red phosphorus can be used. However, in terms of moisture resistance and safety, e.g. prevention of spontaneous ignition, preferable are those prepared by coating the surface of red phosphorus particles with resin.

Examples of the polyammonium phosphate and its derivatives include polyammonium phosphate, and melamine-modified polyammonium phosphate. These are commercially available.

Examples of the compound represented by the aforementioned structural formula (1) include methylphosphonic acid, dimethyl methylphosphate, diethyl methylphosphate, ethylphosphonic acid, propylphosphonic acid, butylphosphonic acid, 2-methylpropylphosphonic acid, t-butylphosphonic acid, 2,3-dimethyl-butylphosphonic acid, octylphosphonic acid, phenylphosphonic acid, dioctyiphenyl phosphonate, dimethylphosphinic acid, methylethylphosphinic acid, methylpropylphosphinic acid, diethylphosphinic acid, dioctylphosphinic acid, phenylphosphinic acid, diethylphenylphosphinic acid, diphenylphosphinic acid, and bis (4-methoxyphenyl) phosphinic acid.

(5) Blend Ratio

① In the first invention, for the total of 100 weight parts of the epoxy resin and the hardener, the total amount of the inorganic filler, chosen from a group consisting of neutralized thermally expandable graphite, metal carbonate, and a hydrated inorganic compound, is 200–500 weight parts. If it is less than 200 weight parts, then adequate fire-resistant performance cannot be obtained. If it is more than 500 weight parts, then the viscosity increases and a paint form is hard to obtain. Even if painting on the object to be coated is possible, the mechanical properties of the paint film significantly decrease and it may not be fit for use. Of the aforementioned total amount of the inorganic filler, the neutralized thermally expandable graphite must account for 15–400 weight parts, preferably 50–350 weight parts, and more preferably 100–320 weight parts.

② In the second invention, for the total of 100 weight parts of the epoxy resin and the hardener, the total amount of the phosphorus compound and the neutralized thermally expandable graphite is 15–400 weight parts. If it is less than 15 weight parts, then adequate fire-resistant performance cannot be obtained. If it is more than 400 weight parts, then the mechanical properties of the paint film significantly decrease and it may not be fit for use. The preferable amount is 50–350 weight parts, and more preferable is 100–320 weight parts.

The weight ratio between the neutralized thermally expandable graphite and the phosphorus compound is (thermally expandable graphite/phosphorus compound)= 0.01–9. If the weight ratio is less than 0.01, then the expansion ratio is insufficient and adequate fire-resistant performance cannot be obtained. If it is more than 9, then the formation of the heat insulating layer becomes insufficient, reducing the fire-resistant properties.

The blend ratio of the hydrated inorganic compound and/or metal carbonate is 10–400 weight parts. If the blend ratio of the hydrated inorganic compound is less than 10 weight parts, then the aforementioned heat absorbing effect of the hydrated inorganic compound does not manifest adequately. A blend ratio above 400 weight parts results in insufficient aggregation, which makes it impossible to obtain sufficient paint film strength. If the blend ratio of the metal carbonate is less than 10 weight parts then, as described above, the residual strength is insufficient. A blend ratio above 400 weight parts results in insufficient aggregation, which makes it impossible to obtain sufficient paint film strength and at the same time impedes the expansion during combustion, making it impossible to obtain sufficient fire-resistance.

The total amount of the neutralized thermally expandable graphite and phosphorus compound, and the metal carbonate and/or hydrated inorganic compound is 200–500 weight parts. If the total amount is less than 200 weight parts then adequate fire-resistance performance cannot be obtained. If it is more than 500 weight parts then the viscosity increases and a paint form is hard to obtain. Even if painting on the object to be coated is possible, the mechanical properties of the paint film significantly decrease and it may not be fit for use.

③ In the third invention, for 100 weight parts of the butyl rubber or isobutylene rubber, the total amount of the inorganic filler, chosen from a group consisting of neutralized thermally expandable graphite, metal carbonate, and a hydrated inorganic compound, is 200–500 weight parts. If it is less than 200 weight parts then adequate fire-resistance performance cannot be obtained. If it is more than 500 weight parts then the viscosity increases and a paint form is hard to obtain. Even if painting on the object to be coated is possible, the mechanical properties of the paint film significantly decrease and it may not be fit for use. Of the aforementioned total amount of the inorganic filler, the neutralized thermally expandable graphite must account for 15–400 weight parts, preferably 50–350 weight parts, and more preferably 100–320 weight parts.

④ In the fourth invention, for the total of 100 weight parts of the butyl rubber or isobutylene rubber, the total amount of the phosphorus compound and the neutralized thermally expandable graphite is 15–400 weight parts. If it is less than 15 weight parts, then adequate fire-resistant performance cannot be obtained. If it is more than 400 weight parts, then the mechanical properties of the paint film significantly decrease and it may not be fit for use. The preferable amount is 50–350 weight parts, and more preferable is 100–320 weight parts.

The weight ratio between the neutralized thermally expandable graphite and the phosphorus compound is (thermally expandable graphite/phosphorus compound)= 0.01–9. If the weight ratio is less than 0.01, then the expansion ratio is insufficient and adequate fire-resistant performance cannot be obtained. If it is more than 9, then the formation of the heat insulating layer becomes insufficient, reducing the fire-resistant properties.

The blend ratio of the hydrated inorganic compound and/or metal carbonate is 10–400 weight parts. If the blend ratio of the hydrated inorganic compound is less than 10 weight parts, then the aforementioned heat absorbing effect of the hydrated inorganic compound does not manifest adequately. A blend ratio above 400 weight parts results in insufficient aggregation, which makes it impossible to obtain sufficient paint film strength. If the blend ratio of the metal carbonate is less than 10 weight parts then, as described above, the residual strength is insufficient. A blend ratio above 400 weight parts results in insufficient aggregation, which makes it impossible to obtain sufficient paint film strength and at the same time impedes the expansion during combustion, making it impossible to obtain sufficient fire-resistance.

The total amount of the neutralized thermally expandable graphite and phosphorus compound, and the metal carbonate and/or hydrated inorganic compound is 200–500 weight parts. If the total amount is less than 200 weight parts then adequate fire-resistance performance cannot be obtained. If it is more than 500 weight parts then the viscosity increases and a paint form is hard to obtain. Even if painting on the object to be coated is possible, the mechanical properties of the paint film significantly decrease and it may not be fit for use.

(6) Viscosity

① The fire-resistant paint which has the composition described above must have a viscosity, measured by a B type viscometer, of 1–1,000 ps. The fire-resistant paint of the present invention has good workability and can be prepared in either a solvent-based or an emulsion-based form. This viscosity can be achieved by adjusting the viscosity-average molecular weight of the epoxy resin, or the butyl rubber or isobutylene rubber, the amount of the inorganic filler added, and the amount of the solvent or water. If the viscosity is less than 1 ps then sagging occurs on the paint film after application, and if it is more than 1,000 ps then the viscosity becomes too high and application becomes difficult.

② In the first and second inventions, it is preferable to adjust the viscosity of the paint by adjusting the viscosity of the epoxy resin or the hardener, rather than using a solvent or water.

In order to adjust the viscosity of the paint via the epoxy resin, an epoxy resin and a hardener which have low viscosities are used. An examples of a low-viscosity epoxy resin is bisphenol F type epoxy resin.

An example of the method for adjusting the paint viscosity without using a solvent or water is a method in which the paint is heated to lower the viscosity. Heating after adding the hardener to the epoxy resin may result in hardening before application, therefore it is preferable to heat up the fire-resistant paint of the present invention, and then mix the hardener into it.

When adjusting the viscosity without using a solvent or water, the total amount of the inorganic filler is preferably 300 weight parts or less for 100 weight parts of the epoxy resin. This is because more than 300 weight parts of the inorganic filler makes it difficult to optimally adjust the viscosity even with the aforementioned method.

③ When a solvent is used to adjust the viscosity, selection of the solvent is not limited in particular. Examples include toluene and xylene.

A suitable solid content of the fire-resistant paint of the present invention, depending on the resin structure, viscosity and molecular weight, is preferably 10–80 wt %, and more preferably 20–70 wt %.

④ When the viscosity is low (1–200 ps), spraying with a spray gun is possible. When the viscosity is higher (200 ps or more), various methods of application such as roller painting become possible and the application thickness can also be easily set. By changing the application thickness, the fire-resistance performance of the object, such as steel bar members, can be determined at will.

(7) Others

Within the range that does not degrade the effect of the present invention, a viscosity adjuster, a phenol-based, amine-based, and sulfur-based anti-oxidant, a metal damage preventive agent, anti-electrification agent, stabilizer, cross-linking agent, lubricant, softener, pigment, etc. can be added to the fire-resistant paint of the present invention.

The fire-resistant paint of the present invention can be prepared by treating the ingredients with a prior art kneading and stirring apparatus.

The fire-resistant paint of the first and the second invention is mixed with the hardener at the time of application to form a fire-resistant cross-linked hardened paint film. The method of hardening the epoxy resin is not limited in particular, and a prior art method can be used.

When the fire-resistant paint of the first and the second invention is a solvent-based paint, the butyl rubber or isobutylene rubber is dissolved in the solvent, and, after the viscosity adjustment, this can be used as is. In the case of the emulsion-based paint, a common preparation method is used as well. For example, there is a method in which butyl rubber or isobutylene rubber, dissolved in the solvent, is dispersed in water by means of an appropriate emulsifier such as nonylphenoxypolyethoxyethanol-sulfate to obtain a coarse particle emulsion, sheared to particles of 1 micrometer or less for fine dispersion, and then the solvent and excess water are removed.

The fire-resistant paint of the present invention, when applied on a base material, forms a fire-resistant paint film. It can be applied with a prior art application method on a base material requiring fire-resistance. There is no particular limitation on how to use the paint. When it is directly used on a base material requiring fire-resistance, a common primer may be applied first, followed by application of the fire-resistant paint on top. A top coating can be added on top of the fire-resistant paint to improve the appearance and weather resistance.

It is also possible to apply the fire-resistant paint on non-woven fabric, woven fabric, film, plastic boards, wooden boards, ceramic boards, rockwool boards, plaster boards, metal boards, etc. and then use these to cover the component requiring fire-resistance.

EXAMPLES

The present invention is described in detail by referring to examples below. The present invention is not limited to these examples. The blend ratios in examples are indicated in weight percent units.

(1) Examples Pertaining to the First and the Second Inventions

Examples 1–4, Comparative Examples 1–3

The epoxy resin, hardener, neutralized thermally expandable graphite, polyammonium phosphate, aluminum hydroxide, and calcium carbonate were mixed with the blend ratios shown in Table 1 and kneaded to obtain fire-resistant paint. The obtained fire-resistant paint was applied on a 0.3 mm-thick PET film treated for separation and heat-hardened in an oven at 150° C. to prepare a base material sheet coated with the fire-resistant paint with a prescribed thickness which was to be used for various evaluations.

<Evaluation of the Heat Insulation>

The base material sheet coated with the fire-resistant paint obtained as described above was cut into 100 mm-long, 100 mm-wide, and 2.0 mm-thick sample pieces. A cone calorimeter (CONE2A from Atlas Electric Devices Company) was used to give 50 kW/m$^2$ (in the horizontal direction) of irradiation heating value to the sample pieces for 15 minutes, and following this, those sample pieces with their far side (the heated surface is the top side) temperature at 260° C. or lower were defined as ○, and those sample pieces with their far side temperature higher than 260° C. were defined as ×. The results are shown in Table 1.

<Evaluation of the Shape Retaining Properties>

The breaking strength of the sample pieces (residue) after the aforementioned fire-resistance evaluation was, measured by using a finger feeling tester (Kato Tech Co., Ltd.).
Measurement Conditions
  Compression strength: 0.1 cm/s
  Indenter: Flat surface, 0.25 cm$^2$
In the aforementioned measurement, those with a breaking point load from 0 to less than 1 kg/cm$^2$ are defined as ×, those with a breaking point load of 1 kg/cm$^2$ or more and less than 2.5 kg/cm$^2$ are defined as Δ, and those with a breaking point load of 2.5 kg/cm$^2$ or more are defined as ○. The results are shown in Table 1.

Those with a shape retaining evaluation of Δ or lower are very fragile and collapsed just by setting the sample piece vertically length-wise. Therefore, those will fall off during combustion if they are used as the fire-resistant material in actual use, and they are expected to manifest fire-resistant performance only for a brief period of time.

<Viscosity>

After the preparation, the viscosity of the a paint was measured by using a B type viscometer (BBH from Tokyo Keiki) at 23° C. with a #5 rotor at 1 rpm or 5 rpm.

<Paint Film Strength>

According to JIS K6301, the tensile test was conducted on the sample pieces at a velocity of 200 mm/min, and the elongation at the point of breaking (development of a crack) was measured. 20% or more was defined as ○, and less than 20% was defined as ×. If this elongation is less than 20%, cracks develop easily when the component after paint application is exposed to a shock or when strain occurs, which leads to partial reduction of the fire-resistace performance. The base material coated with the fire-resistant paint obtained as described above was punched into a dumbbell shape (the parallel section was 10 mm wide and 25 mm long, and the thickness was 2 mm) to obtain sample pieces.

<Oxygen Index>

According to JIS K7201, the base material sheet coated with the fire-resistant paint was cut into a sample piece (150 mm long, 60 mm wide, 1 mm thick), which was measured by using an oxygen index measurement apparatus (candle method combustion tester D type from Toyo Seiki Seisakusho, Ltd). Those with an oxygen index of 40 or more were defined as ○, and those with an oxygen index of less than 40 were defined as ×.

<Fire-resistance Test>

The fire-resistance test was conducted according to JIS A1304 only on Examples 1 and 4 and Comparative example 2.

Sample piece: Square steel column, 300×300×1200 mm, 12 mm thick

Positions of the thermocouples: each of the four corners and each center of the four flat surfaces, i.e. a total of eight The paint was applied on the column such that the thickness would be 2 mm, and, after complete hardening, one hour of the fire-resistance test was conducted. During the test, the temperature of the steel column was recorded using the thermocouples, and those with an average steel column temperature of 350° C. and a maximum of 450° C. or lower were defined as ○.

TABLE 1

|  |  | Example | | | | Comparative example | | |
|---|---|---|---|---|---|---|---|---|
|  |  | 1 | 2 | 3 | 4 | 1 | 2 | 3 |
| Resin | Epoxy resin ① | 40 | 40 | — | — | 40 | 40 | 40 |
|  | Epoxy resin ② | — | — | 63 | 63 | — | — | — |
| Hardener | Diamine-based hardener ① | 60 | 60 | — | — | 60 | 60 | 60 |
|  | Diamine-based hardener ② | — | — | 37 | 37 | — | — | — |
| Thermally expandable | Thermally expandable | 150 | 50 | 25 | 70 | 30 | — | 70 |

TABLE 1-continued

|  |  | Example 1 | Example 2 | Example 3 | Example 4 | Comp. 1 | Comp. 2 | Comp. 3 |
|---|---|---|---|---|---|---|---|---|
| graphite | graphite |  |  |  |  |  |  |  |
| Phosphorus compound | Polyammonium phosphate | — | — | 80 | 100 | 100 | 20 | — |
| Hydrated inorganic compound | Aluminum hydroxide | 150 | 200 | 150 | 100 | 100 | 50 | 200 |
| Metal carbonate | Calcium carbonate | — | — | — | 75 | 100 | 50 | 500 |
| Solvent | Xylene | 50 | 25 | — | 30 | — | — | 100 |
| Evaluation items | Viscosity (ps) | 480 | 640 | 55 | 35 | Unable to measure | 230 | 380 |
|  | Paint film thickness (mm) | 2 | 2 | 2 | 2 | Unable to prepare | 2 | 2 |
|  | Paint film elongation (%) | 120 | 180 | 70 | 40 | — | 200 | Unable to measure |
|  | Elastic modulus (kgf/mm$^2$) | 100 | 69 | 245 | 316 | — | 48 | — |
|  | Oxygen index | ○ | ○ | ○ | ○ | — | ○ | ○ |
|  | Fire resistance | ○ | — | — | ○ | — | × | — |
|  | Heat resistance | ○ | ○ | ○ | ○ | — | × | ×[*1] |
|  | Shape retaining properties | ○ | ○ | ○ | ○ | — | ○ | × |

[*1]The residue collapsed.

Epoxy resin ①: Bisphenol F type epoxy resin (viscosity 33 ps, Epikote E807 from Yuka Shell Epoxy Kabushiki Kaisha)

Epoxy resin ②: Bisphenol F type epoxy resin (viscosity 1.7 ps, Epikote YL6795 from Yuka Shell Epoxy Kabushiki Kaisha)

Diamine-based hardener ①: (viscosity 25 ps, Epikure FL502 from Yuka Shell Epoxy Kabushiki Kaisha)

Diamine-based hardener ②: (viscosity 2.7 ps, Epikure YLH854 from Yuka Shell Epoxy Kabushiki Kaisha)

Thermally expandable graphite: Neutralized thermally expandable graphite (80 mesh, Flamecut GREP-EG from Tosoh Corporation)

Polyammonium phosphate (EXOLIT AP422 from Clariant GmbH)

Aluminum hydroxide: (average particle diameter 18 micrometers, Higilite H-31 from Showa Denko, K.K.)

Calcium carbonate: (average particle diameter 8 micrometers, BF-300 from Bihoku Funka Kogyo Co., Ltd.)

Table 1 indicates that the fire-resistant paint of Examples have superior fire-resistance performance, heat insulating performance, and shape retaining properties.

(2) Examples Pertaining to the Third and the Fourth Inventions

Examples 5–10, Comparative Examples 4–8

The ingredients shown in Table 2 and Table 3 were added to the solvent, the inorganic filler was then stirred in with a mixer and dissolved and dispersed to prepare a fire-resistant paint.

Prepared paint (A) was used as such to carry out evaluation 1.

Prepared paint (A) was applied on a galvanized steel plate with an area of 10×10 cm and a thickness of 0.3 mm such that the paint film thickness would be the required value, and dried in a 80° C. oven to obtain sample piece (B), which was used to carry out. evaluations 2, 3, 6, 8, and 9.

Prepared paint (A) was applied on a 0.3 mm-thick PET film treated for separation such that the paint film thickness would be the required value, and dried in a 80° C. oven. Then the film was peeled to obtain sample piece (C), which was used to carry out evaluations 4, 5, and 10.

Prepared paint (A) was sprayed on a 0.3 mm-thick iron plate such that the paint film thickness would be 2 mm, and dried in a 80° C. oven to obtain sample piece (D), which was used to carry out fire-resistance test 7.

1. Viscosity

After the preparation, the viscosity at 23° C. of the paint was measured by using a B type viscometer (BBH from Tokyo Keiki) with a #4 rotor at 1 rpm.

2. Expansion Ratio

Sample piece (B) which had a 2.0 mm-thick paint film was placed on a cone calorimeter (CONE2A from Atlas Electric Devices Company) with the irradiation heating value set at 50 kW/m$^2$, and, after it was completely burned in the horizontal position, the residue was removed to measure the expansion ratio of the residue after expansion. The expansion ratio was calculated using the following equation.

Expansion ratio (times)=Residue thickness after heating/Sheet thickness before heating 3. Residue Strength Sample piece (B) which had a 2.0 mm-thick paint film was placed on a cone calorimeter (CONE2A from Atlas Electric Devices Company) with the irradiation heating value set at 50 kW/m , and, after it was completely burnt in the horizontal position, the residue was removed to measure the strength of the residue after combustion by using a finger feeling tester (Kato Tech Co., Ltd.).

Using a 25 cm$^2$ indenter at a velocity of 0.1 cm/sec, the residue was compressed and the first maximum in the strain-stress curve was defined as the strength at which the residue ruptures (=residue strength).

4. Oxygen Index

According to JIS K7201, the testing sheet coated with the fire-resistant paint was cut into a sample piece (150 mm long, 60 mm wide, 1 mm thick), which was measured using an oxygen index measurement apparatus (candle method combustion tester D type from Toyo Seiki Seisaku-sho, Ltd).

5. Paint Film Strength

According to JIS K6301, the tensile test was conducted on the #2 dumbbell shape sample piece punched out from (C) (the parallel section was 10 mm wide and 25 mm long, and the thickness was 2 mm) at a velocity of 200 mm/min, and the elongation at the point of breaking (development of a crack) was measured.

If this elongation is small, cracks develop easily when the component after paint application is exposed to a shock or when strain occurs, which leads to partial reduction of the fire-resistace performance.

6. Heat Insulation Test

A cone calorimeter (CONE2A from Atlas Electric Devices Company) was used to give 50 kW/m² (in the horizontal direction) of irradiation heating value to sample piece B with a paint film thickness of 2.0 mm for 15 minutes, and following this, those sample pieces with their far side (the heated surface is the top side) temperature at 260° C. or lower were defined as ○ and those sample pieces with their far side temperature higher than 260° C. were defined as ×.

7. Fire-resistance Test

The fire-resistance test was conducted as described below according to JIS A1304.

Sample piece: Square steel column, 300×300×1200 mm, 12 mm thick

Positions: of the thermocouples: each of the four corners and each center of the four flat surfaces, i.e. a total of eight.

The column was covered with sample piece B with a paint film thickness of 2.0 mm, and the temperature of the steel column was recorded by using the thermocouples.

Those with an average steel column temperature of 350° C. or lower and a maximum of 450° C. or lower (JIS A1304 compliant level) were defined as ○.

8. Elution-to-water Test

Sample piece B with a paint film thickness of 2.0 mm was soaked in water at 23° C. for one hour, and, after drying at 100° C., the weight reduction ratio was measured to calculate the degree of elution.

Degree of elution (%)=(Sheet weight before soaking−Sheet weight after soaking)/Sheet weight before soaking 9. Existence of Cracks Caused by Nailing A nail was hammered into the center of sample piece B with a paint film thickness of 2.0 mm, and the area around the nail head was checked for cracks.

10. Adhesive Properties of the Paint Film

According to JIS Z 0237, sample piece C with a paint film thickness of 2.0 mm was cut into 2.5 cm wide strips, pasted on a galvanized iron sheet, and, after an hour, peeled off the sheet at a velocity of 300 mm/min in the 90 degree direction to measure the peeling strength.

TABLE 2

| | | Example | | | | | |
|---|---|---|---|---|---|---|---|
| | | 5 | 6 | 7 | 8 | 9 | 10 |
| Resin | Butyl rubber | 100 | 100 | 100 | | | |
| | Isobutylene rubber ① | | | | | 100 | 100 |
| | Isobutylene rubber ② | | | | 100 | | |
| | Acrylic resin ① | | | | | | |
| | Acrylic resin ② | | | | | | |
| Thermally expandable graphite | Thermally expandable graphite ① | 150 | 30 | 30 | 80 | 300 | 50 |
| | Thermally expandable graphite ② | | | | | | |
| | Thermally expandable graphite ③ | | | | | | |
| Phosphorus compound | Polyammonium phosphate ① | | 100 | 90 | 150 | | |
| | Polyammonium phosphate ② | | | | | | 50 |
| | Polyammonium phosphate ③ | | | | | | |
| | Red phosphorus | | | 10 | | | |
| Hydrated inorganic compound | Aluminum hydroxide | 50 | 50 | 100 | 100 | 50 | 20 |
| | Magnesium hydroxide | | 20 | | | | |
| Metal carbonate | Calcium carbonate | 100 | 100 | 100 | 130 | | 30 |
| | Strontium carbonate | | | | 20 | | |
| Others | Polybutene | | | | 10 | | |
| | Tackifier | | | | 45 | | |
| | Vermiculite | | | | 20 | | |
| | Melamine | | | | | | |
| | Dipentaerythritol | | | | | | |
| | Titanium dioxide | | | | | | |
| Solvent | Toluene | 800 | 1000 | 650 | 600 | 2000 | 250 |
| | Xylene | | | 500 | | | |
| | Solid content (wt %) | 33 | 29 | 29 | 49 | 18 | 50 |
| | Viscosity (ps) | 300 | 250 | 200 | 600 | 100 | 400 |
| Evaluation items | Expansion ratio (times) | 25.0 | 10.2 | 10.0 | 13.0 | 48.0 | 11.0 |
| | Residue strength (kg/cm²) | 0.04 | 1.70 | 1.10 | 0.80 | 0.01 | 0.70 |
| | Fire resistance | ○ | ○ | ○ | ○ | ○ | ○ |
| | Maximum temperature (° C.) in the fire-resistance test | 335 | 350 | 355 | 340 | 330 | 340 |
| | Average temperature (° C.) in the fire-resistance test | 315 | 330 | 330 | 330 | 310 | 320 |
| | Heat insulation | ○ | ○ | ○ | ○ | ○ | ○ |

TABLE 2-continued

|  | Example |  |  |  |  |  |
|---|---|---|---|---|---|---|
|  | 5 | 6 | 7 | 8 | 9 | 10 |
| Oxygen index | 45 | 44 | 48 | 50 | 40 | 40 |
| Paint film strength (elongation %) | 250 | 300 | 220 | 110 | 220 | 280 |
| Elastic modulus (kgf/mm$^2$) | 1.6 | 1.0 | 1.5 | 1.8 | 1.5 | 1.2 |
| Elution to water (%) | 0.05 | 0.1 | 0.1 | 0.1 | 0.05 | 0.08 |
| Cracks caused by nailing | Not observed | Not observed | Not observed | Not observed | Not observed | Not observed |
| Peeling strength (gf/25 mm) | 650 | 600 | 700 | 500 | 650 | 700 |

TABLE 3

| | | Comparative Example | | | | |
|---|---|---|---|---|---|---|
| | | 4 | 5 | 6 | 7 | 8 |
| Resin | Butyl rubber | | 100 | | | |
| | Isobutylene rubber ① | 100 | | | | |
| | Isobutylene rubber ② | | | 100 | | |
| | Acrylic resin ① | | | | 80 | 80 |
| | Acrylic resin ② | | | | 20 | 20 |
| Thermally expandable graphite | Thermally expandable graphite ① | 5 | 600 | | | |
| | Thermally expandable graphite ② | | | | 25 | |
| | Thermally expandable graphite ③ | | | | | 25 |
| Phosphorus compound | Polyammonium phosphate ① | | | 100 | | |
| | Polyammonium phosphate ② | | | | | |
| | Polyammonium phosphate ③ | | | | 200 | 200 |
| | Red phosphorus | | | | | |
| Hydrated inorganic compound | Aluminum hydroxide | | | | | |
| | Magnesium hydroxide | | | | | |
| Metal carbonate | Calcium carbonate | | | | | |
| | Strontium carbonate | | | 20 | | |
| Others | Polybutene | | | | | |
| | Tackifier | | | | | |
| | Vermiculite | | | | | |
| | Melamine | | | | 60 | 60 |
| | Dipentaerythritol | | | | 60 | |
| | Titanium dioxide | | | | 80 | 80 |
| Solvent | Toluene | 800 | 160 | 200 | 1000 | 1000 |
| | Xylene | | | | | |
| | Solid content (wt %) | 12 | 90 | 50 | 34 | 32 |
| | Viscosity (ps) | 80 | *2 | 450 | 400 | 370 |
| Evaluation items | Expansion ratio (times) | 5.2 | 55 | 5 | 4 | 6 |
| | Residue strength (kg/cm$^2$) | 0.01 | 0.01 | *4 | 0.5 | 0.01 |
| | Fire resistance | × | ○ | × | × | × |
| | Maximum temperature (° C.) in the fire-resistance test | 950 | *3 | 960 | 930 | 480 |
| | Average temperature (° C.) in the fire-resistance test | 800 | *3 | 780 | 780 | 360 |
| | Heat insulation | × | ○ | × | × | × |
| | Oxygen index | *1 | *3 | 38 | 48 | 50 |
| | Paint film strength (elongation %) | 290 | Unable to measure | 300 | 80 | 160 |
| | Elastic modulus (kgf/mm$^2$) | 0.9 | Unable to measure | 0.9 | 2.2 | 2.0 |
| | Elution to water (%) | 0.05 | 0.05 | 0.1 | 1 | 0.1 |
| | Cracks caused by nailing | Not observed | Not observed | Not observed | Observed | Observed |
| | Peeling strength (gf/25 mm) | 750 | Unable to measure | 500 | *5 | *6 |

Butyl rubber: Flory's viscosity-average molecular weight 450.000, trade name "Exxonbutyl 165" (from Exxon Chemical Ltd.)

Isobutylene rubber ①: Flory's viscosity-average molecular weight 11,000, trade name "VISTANEX LM-MH" (from Exxon Chemical Ltd.)

Isobutylene rubber ②: Flory's viscosity-average molecular weight 2,100,000, trade name "VISTANEX MML-140" (from Exxon Chemical Ltd.)

Acrylic ①: Trade name "Priolite AC80" (from Goodyear Chemical Co., Ltd.)

Acrylic ②: Trade name "Priolite AC4" (from Goodyear Chemical Co., Ltd.)

Polybutene: Trade name "H-1900" (from Amoco Co., Ltd.), weight-average molecular weight 2270 Tackifier: Trade name "Escorez 1102B" (from Tonex Co. , Ltd.)

Polyammonium phosphate ①: Trade name "EXOLIT AP422" (from Clariant GmbH), average particle diameter 15 micrometers Polyammonium phosphate ②: Trade name "Terraju C80" (from Chisso Corporation), average particle diameter 15–25 micrometers Polyammonium phosphate ③: Trade name "EXOLIT AP462" (from Clariant GmbH), average particle diameter 15 micrometers Red phosphorus: Trade name "EXOLIT RP 605" (from Clariant GmbH), average particle diameter 30–40 micrometers Thermally expandable graphite ①: Trade name "Flamecut GREP-EG" (from Tosoh Corporation) (expansion initiation temperature=200° C.) 80 mesh Thermally expandable graphite ②: Trade name "Expandable Graphite No. 8099" (from Chuo Kasei Co., Ltd.) (expansion initiation temperature=500° C.) 60 mesh Thermally expandable graphite ③: Trade name "Expandable Graphite No. 8099-LTE-u" (from Chuo Kasei Co., Ltd.) (expansion initiation temperature=200° C.) 60 mesh Vermiculite: Trade name "Vermiculite" 60 mesh (Kinsei Matec Co., Ltd.)

Aluminum hydroxide: Trade name "Higilite H-31" (Showa Denko, K.K.) 18 micrometers Magnesium hydroxide: Trade name "Kisuma 5B" (from Kyowa Chemical Industry Co., Ltd.) average particle diameter 1.9 micrometers Calcium carbonate: Trade name "BF300" (from Bihoku Funka Kogyo Co., Ltd.) average particle diameter 8 micrometers Strontium carbonate: (from Sakai Chemical Industry Co., Ltd.) average particle size 1.2 micrometers Melamine: from Wako Pure Chemical Industries, Ltd.

Dipentaerythritol: Trade name "D-PE (Dipentaerythritol) 300M" (from Koei Chemical Co., Ltd.) 300 mesh, average particle size 5 micrometers Titanium dioxide: Trade name "Tipaque CR95" (from Ishihara Sangyo Kaisha, Ltd.)

Notes on the parts in the table marked with *.

Comparative Example 4

*1) When the oxygen index measurement jig was mounted, sagging occurred, which made accurate measurement impossible.

Comparative Example 5

*2) Not viscous but crumbly. The viscosity measurement was not possible.

*3) When the oxygen index measurement jig was mounted, crumbling occurred from the edge, which made accurate measurement impossible.

*3') Not tested because the paint thickness could not be made even.

Comparative Example 6

*4) Expansion did occur. However, it was expansion of only a thin skin on the surface and deflated when touched by something, making it impossible to measure the residue strength.

Comparative Example 7

*5) Since the expansion ratio was not sufficient, the heat insulation was not sufficient and therefore did not pass the fire-resistance test. Since the paint film had significant elution and water resistance was poor, a top coating would be necessary.

Comparative Example 8

*6) Since polyhydric alcohol was not contained, the water resistance was adequate. However, the residue was fragile and the expansion ratio was insufficient, and therefore it did not pass the fire-resistance test.

Table 2 indicates that the fire-resistant paint of Examples have superior fire-resistance performance, heat insulation performance, and shape retaining properties.

INDUSTRIAL APPLICABILITY OF THE INVENTION

The fire-resistant paint of the present invention has particularly remarkable fire resistance, and can be used in a wide range of applications.

What is claimed is:

1. A fire-resistant paint containing an epoxy resin, a hardener, and an inorganic filler wherein ① for the total of 100 weight parts of the epoxy resin and the hardener, ② 200–500 weight parts of the inorganic filler, selected from the group consisting of neutralized thermally expandable graphite, metal carbonate, and a hydrated inorganic compound;

③ for the inorganic filler, at least 15–400 weight parts of neutralized thermally expandable graphite; and ④ the viscosity of the fire-resistant paint is 1–1,000 ps as measured by a B-type viscometer, said neutralized thermally expandable graphite having a particle size of 20–200 mesh.

2. A fire-resistant paint containing butyl rubber or isobutylene rubber and an inorganic filler wherein ① Flory's viscosity-average molecular weight of the butyl rubber or isobutylene rubber is 5,000–4,000,000; and ② for 100 weight parts of the butyl rubber or isobutylene rubber, ③ 200–500 weight parts of the inorganic filler, chosen from a group consisting of neutralized thermally expandable graphite, metal carbonate, and a hydrated inorganic compound is contained;

④ for the inorganic filler, at least 15–400 weight parts of neutralized thermally expandable graphite is contained; and ⑤ the viscosity of the fire-resistant paint is 1–1,000 ps as measured by a B-type viscometer.

3. A fire-resistant paint containing butyl rubber or isobutylene rubber and an inorganic filler wherein
① Flory's viscosity-average molecular weight of the butyl rubber or isobutylene rubber is 5,000–4,000,000; and
② for 100 weight parts of the butyl rubber or isobutylene rubber,
③ 15–400 weight parts of neutralized thermally expandable graphite and a phosphorus compound is contained;
④ the weight ratio between the neutralized thermally expandable graphite and the phosphorus compound is (thermally expandable graphite/phosphorus compound)=0.01–9;
⑤ 10–400 weight parts of a metal carbonate and/or hydrated inorganic compound is contained;
⑥ the total amount of the neutralized thermally expandable graphite and phosphorus compound, and the metal carbonate and/or hydrated inorganic compound is 200–500 weight parts; and
⑦ the viscosity. of the fire-resistant paint is 1–1,000 ps as measured by a B-type viscometer.

4. A fire-resistant paint containing an epoxy resin, a hardener, and an inorganic filler wherein
① with a total of 100 weight parts of the epoxy resin and the hardener,
② there is contained 15–400 weight parts of neutralized thermally expandable graphite and a phosphorus compound;
③ the weight ratio between the neutralized thermally expandable graphite and the phosphorus compound is (thermally expandable graphite/phosphorus compound)=0.01–9;
④ there is contained 10–400 weight parts of a metal carbonate and/or hydrated inorganic compound;
⑤ the total amount of the neutralized thermally expandable graphite and phosphorus compound, and the metal carbonate and/or hydrated inorganic compound is 200–500 weight parts;
⑥ the viscosity of the fire resistant paint is 1–1,000 Ps as measured by a B-type viscometer; and
⑦ wherein the average particle size of said neutralized thermally expandable graphite is 20–200 mesh.

5. A fire-resistant paint containing an epoxy resin, a hardener, and an inorganic filler wherein
① for the total of 100 weight parts of the epoxy resin and the hardener,
② 200–500 weight parts of an inorganic filler selected from the group consisting of neutralized thermally expandable graphite, metal carbonate, and a hydrated inorganic compound;
③ for the inorganic filler, at least 15–400 weight parts of neutralized thermally expandable graphite; and
④ the viscosity of the fire-resistant paint is 1–1,000 ps as measured by a B-type viscometer, said metal carbonate being one or more metal carbonates selected from the group consisting of calcium carbonate, magnesium carbonate, strontium carbonate, barium carbonate and zinc carbonate.

6. The fire-resistant paint of claim 5, wherein said hydrated inorganic compounds are selected from the group consisting of calcium hydroxide, magnesium hydroxide, aluminum hydroxide, and hydrotalcite.

7. A fire-resistant paint containing an epoxy resin, a hardener, and an inorganic filler wherein
① for the total of 100 weight parts of the epoxy resin and the hardener,
② 200–500 weight parts of the inorganic filler, selected from the group consisting of neutralized thermally expandable graphite, metal carbonate, and a hydrated inorganic compound;
③ for the inorganic filler, at least 15–400 weight parts of neutralized thermally expandable graphite; and
④ the viscosity of the fire-resistant paint is 1–1,000 ps as measured by a B-type viscometer, wherein said fire-resistant paint is a no-solvent paint.

8. The fire-resistant paint of claim 2 wherein said fire-resistant paint is a solvent-based or emulsion-based paint containing an organic solvent or water.

9. A fire-resistant paint-coated base material coated with the paint film by applying the fire-resistant paint of claim 1 on the base material.

10. A base material coated with a fire-resistant paint containing an epoxy resin, a hardener, and an inorganic filler wherein
① for the total of 100 weight parts or the epoxy resin and the hardener,
② 200–500 weight parts of the inorganic filler, selected from the group consisting of neutralized thermally expandable graphite, metal carbonate, and a hydrated inorganic compound;
③ for the inorganic filler, at least 15–400 weight parts of neutralized thermally expandable graphite; and
④ the viscosity of the fire-resistant paint is 1–1,000 ps as measured by a B-type viscometer, said base material being non-woven fabric, woven fabric, film, plastic board, wooden board, ceramic board, rockwool board, plaster board, or metal boar.

11. A base material coated with a fire-resistant paint of claim 4.

12. The fire-resistant paint of claim 2 wherein the average particle size of said neutralized thermally expandable graphite is 20–200 mesh.

13. The fire-resistant paint of claim 3 wherein the average particle size of said neutralized thermally expandable graphite is 20–200 mesh.

14. A fire-resistant paint containing an epoxy resin, a hardener, and an inorganic filler wherein
① for the total of 100 weight parts of the epoxy resin and the hardener,
② 15–400 weight parts of neutralized thermally expandable graphite and a phosphorus compound;
③ the weight ratio between the neutralized thermally expandable graphite and the phosphorus compound is (thermally expandable graphite/phosphorus compound)=0.01–9;
④ 10–400 weight parts of a metal carbonate and/or hydrated inorganic compound;
⑤ the total amount of the neutralized thermally expandable graphite and phosphorus compound, and the metal carbonate and/or hydrated inorganic compound is 200–500 weight parts; and
⑥ the viscosity of the fire-resistant paint is 1–1,000 ps as measured by a B-type viscometer,
wherein said metal carbonate is one or more metal carbonates selected from the group consisting of calcium carbonate, magnesium carbonate, strontium carbonate, barium carbonate and zinc carbonate.

15. A fire-resistant paint containing butyl rubber or isobutylene rubber and an inorganic filler wherein ① Flory's viscosity-average molecular weight of the butyl rubber or isobutylene rubber is 5,000–4,000,000; and ② for 100 weight parts of the butyl rubber or isobutylene rubber, ③ 200–500 weight parts of the inorganic filler, selected from the group consisting of neutralized thermally expandable graphite, metal carbonate, and a hydrated inorganic compound;

④ for the inorganic filler, at least 15–400 weight parts of neutralized thermally expandable graphite; and the viscosity of the fire-resistant paint is 1–1,000 ps as measured by a B-type viscometer, wherein said metal carbonate is one or more metal carbonates selected from the group consisting of calcium carbonate, magnesium carbonate, strontium carbonate, barium carbonate and zinc carbonate.

16. The fire-resistant paint of claim 3, wherein said metal carbonate is one ore more metal carbonates chosen from among the group consisting of calcium carbonate, magnesium carbonate, strontium carbonate, barium carbonate and zinc carbonate.

17. A fire-resistant paint containing an epoxy resin, a hardener, and an inorganic filler wherein ① for the total of 100 weight parts of the epoxy resin and the hardener, ② 200–500 weight parts of the inorganic filler, selected from the group consisting of neutralized thermally expandable graphite, metal carbonate, and a hydrated inorganic compound;

③ for the inorganic filler, at least 15–400 weight parts of neutralized thermally expandable graphite; and ④ the viscosity of the fire-resistant paint is 1–1,000 ps as measured by a B-type viscometer, wherein the average particle size of said neutralized thermally expandable graphite 20–200 mesh, and carbonate is one or more metal carbonates selected from the group consisting of calcium carbonate, magnesium carbonate, strontium carbonate, barium carbonate and zinc carbonate.

18. A fire-resistant paint containing an epoxy resin, a hardener, and an inorganic filler wherein ① for the total of 100 weight parts of the epoxy resin and the hardener, ② 15–400 weight parts of neutralized thermally expandable graphite and a phosphorus compound;

③ the weight ratio between the neutralized thermally expandable graphite and the phosphorus compound is (thermally expandable graphite/phosphorus compound)=0.01–9;

④ 10–400 weight parts of a metal carbonate and/or hydrated inorganic compound;

⑤ the total amount of the neutralized thermally expandable graphite and phosphorus compound, and the metal carbonate and/or hydrated inorganic compound is 200–500 weight parts; and ⑥ the viscosity of the fire-resistant paint is 1–1,000 ps as measured by a B-type viscometer, wherein said hydrated inorganic compounds are selected from the group consisting of calcium hydroxide, magnesium hydroxide, aluminum hydroxide, and hydrotalcite.

19. The fire-resistant paint of claim 2, wherein said hydrated inorganic compounds are chosen from among the group consisting of calcium hydroxide, magnesium hydroxide, aluminum hydroxide, and hydrotalcite.

20. The fire-resistant paint of claim 3, wherein said hydrated inorganic compounds are chosen from among the group consisting of calcium hydroxide, magnesium hydroxide, aluminum hydroxide, and hydrotalcite.

21. A fire-resistant paint containing an epoxy resin, a hardener, and an inorganic filler wherein ① for the total of 100 weight parts of the epoxy resin and the hardener, ② 200–500 weight parts of the inorganic filler, selected from the group consisting of neutralized thermally expandable graphite, metal carbonate, and a hydrated inorganic compound;

③ for the inorganic filler, at least 15–400 weight parts of neutralized thermally expandable graphite; and ④ the viscosity of the fire-resistant paint is 1–1,000 ps as measured by a B-type viscometer, said metal carbonate being one or more metal carbonates selected from the group consisting of calcium carbonate, magnesium carbonate, strontium carbonate, barium carbonate and zinc carbonate, wherein said hydrated inorganic compounds are selected from the group consisting of calcium hydroxide, magnesium hydroxide, aluminum hydroxide, and hydrotalcite.

22. A base material coated with a fire-resistant paint containing an epoxy resin, a hardener, and an inorganic filler wherein ① for the total of 100 weight parts of the epoxy resin and the hardener, ② 15–400 weight parts of neutralized thermally expandable graphite and a phosphorus compound;

③ the weight ratio between the neutralized thermally expandable graphite and the phosphorus compound is (thermally expandable graphite/phosphorus compound)=0.01–9;

④ 10–400 weight parts of a metal carbonate and/or hydrated inorganic compound;

⑤ the total amount of the neutralized thermally expandable graphite and phosphorus compound, and the metal carbonate and/or hydrated inorganic compound is 200–500 weight parts; and ⑥ the viscosity of the fire-resistant paint is 1–1,000 ps as measured by a B-type viscometer.

23. A fire-resistant paint-coated base material coated with the paint film by applying the fire-resistant paint of claim 2 on the base material.

24. A fire-resistant paint-coated base material coated with the paint film by applying the fire-resistant paint of claim 3 on the base material.

25. A base material coated with a fire-resistant paint containing an epoxy resin, a hardener, and an inorganic filler wherein ① for the total of 100 weight parts of the epoxy resin and the hardener, ② 200–500 weight parts of the inorganic filler, selected from group consisting of neutralized thermally expandable graphite, metal carbonate, and a hydrated inorganic compound;

③ for the inorganic filler, at least 15–400 weight parts of neutralized thermally expandable graphite; and ④ the viscosity of the fire-resistant paint is 1–1,000 ps as measured by a B-type viscometer, wherein the average particle size of said neutralized thermally expandable graphite is 20–200 mesh.

26. A base material coated with a fire-resistant paint containing an epoxy resin, a hardener, and an inorganic filler wherein ① for the total of 100 weight parts of the epoxy resin and the hardener, ② 200–500 weight parts of the inorganic filler, selected from the group consisting of neutralized thermally expandable graphite, metal carbonate, and a hydrated inorganic compound;

③ for the inorganic filler, at least 15–400 weight parts of neutralized thermally expandable graphite; and ④ the viscosity of the fire-resistant paint is 1–1,000 ps as measured by a B-type viscometer, said metal carbonate being one or more metal carbonates selected from the group consisting of calcium carbonate, magnesium carbonate, strontium carbonate, barium carbonate and zinc carbonate.

27. A base material coated with a fire-resistant paint containing an epoxy resin, a hardener, and an inorganic filler wherein ① for the total of 100 weight parts of the epoxy resin and the hardener, ② 200–500 weight parts of the inorganic filler, selected from the group consisting of neutralized thermally expandable graphite, metal carbonate, and a hydrated inorganic compound;

③ for the inorganic filler, at least 15–400 weight parts of neutralized thermally expandable graphite is contained; and ④ the viscosity of the fire-resistant paint is 1–1,000 ps as measured by a B-type viscometer, wherein said hydrated inorganic compounds are selected from the group consisting of calcium hydroxide, magnesium hydroxide, aluminum hydroxide, and hydrotalcite.

28. A base material coated with a fire-resistant paint containing an epoxy resin, a hardener, and an inorganic filler wherein ① for the total of 100 weight parts of the epoxy resin and the hardener, ② 200–500 weight parts of the inorganic filler, selected from the group consisting of neutralized thermally expandable graphite, metal carbonate, and a hydrated inorganic compound is contained;

③ for the inorganic filler, at least 5–400 weight parts of neutralized thermally expandable graphite; and ④ the viscosity of the fire-resistant paint is 1–1,000 ps as measured by a B-type viscometer, wherein said fire-resistant paint is a no-solvent paint.

29. A fire-resistant paint-coated base material coated with the paint film by applying the fire-resistant paint of claim 8 on the base material.

30. A fire-resistant paint containing an epoxy resin, a hardener, and an inorganic filler wherein ① for the total of 100 weight parts of the epoxy resin and the hardener, ② 15–400 weight parts of neutralized thermally expandable graphite and a phosphorus compound;

③ the weight rate between the neutralized thermally expandable graphite and the phosphorus compound is (thermally expandable graphite/phosphorus compound)=0.01–9;

④ 10–400 weight parts of a metal carbonate and/or hydrated inorganic compound;

⑤ the total amount of the neutralized thermally expandable graphite and phosphorus compound, and the metal carbonate and/or hydrated inorganic compound is 200–500 weight cars; and ⑥ the viscosity of the fire-resistant paint is 1–1,000 ps as measured by a B-type e, and wherein said fire-resistant paint as a no-solvent paint.

31. The fire-resistant paint of claim 3, wherein said fire-resistant paint is a solvent-based or emulsion-based paint containing an organic solvent or water.

* * * * *